_United States Patent Office_

3,439,606
Patented Apr. 22, 1969

3,439,606
STEEL-TAPE BINDING MACHINE
Jan Bursik, Ladislav Bursik, Ladislav Kusiak, and Miroslav Nierla, Ostrava, Czechoslovakia, assignors to Vitkovicke zelezarny Klementa Gottwalda, narodni podnik, Ostrava, Czechoslovakia
Filed Oct. 5, 1967, Ser. No. 674,700
Claims priority, application Czechoslovakia, Oct. 10, 1966, 6,433/66
Int. Cl. B65b 13/04, 13/34; B23k 9/28
U.S. Cl. 100—26                                   7 Claims

ABSTRACT OF THE DISCLOSURE

A machine for binding objects together with a steel tape, which comprises means for guiding a steel tape around the objects to be bound, said means being operatively mounted on a supporting frame. A supporting plate is mounted in the frame. A pair of exchangeable stationary welding electrodes is secured to the underside of the supporting plate and is adapted to cooperate with two independently reciprocally movably mounted electrodes, which are respectively connected to two driving cylinders. A combination clamping and cutting device is reciprocally movably mounted in the frame of the machine. A clamping edge of the combination clamping and cutting device cooperates with a recess in the underside of the supporting plate so as to clamp the steel tape during a preselected period of the binding operation and cooperates with a stationary cutting edge so as to cut the steel tape during an other preselected period of the binding operation. A steel-tape feeding and tensioning device is mounted in the machine, adjacent to the combination clamping and cutting device. The former serves to feed the steel tape through the latter and around the objects to be bound together. Thereafter the clamping and cutting device clamps the steel tape so that a predetermined length of overlapping tape is held together. The feeding and tensioning device then places the tape under tension around the objects to be bound together. One of the movable electrodes is then moved by its driving cylinder towards the overlapping steel tape and urges it against the associated stationary electrode, thereby spot-welding the overlapping tape together. The clamping and cutting device thereafter releases the tape and cuts it so that the tape is held in tension around the objects to be bound together only by the spot weld, thereby testing the strength of the latter. Finally, the other movable electrode is moved by its driving cylinder toward the overlapping steel tape and urges it against the other stationary electrode, thereby forming a second spot weld on the overlapping tape.

_Brief description_

This invention relates to machines for binding objects together by placing a steel tape around said objects and thereafter spot-welding an overlapping portion of the tape together.

The known machines for performing the afore-described operation generally include means for simultaneously spot-welding the tape together at two separate areas. The ends of the steel tape are held fast under tension prior to spot-welding together at two separate spots, so that the tension around the objects to be bound is not relaxed before, during and after the tape has been cut. To effect this, the tape in the known machines is held together by means of jaws, which are arranged behind the cutting plane of the scissors when the direction from the welding electrode is used as a reference. In these known arrangements the supporting plate of the machine is disposed between the tape and the material and co-acts with the front and rear jaws, while also supporting the upper welding electrodes of the device. Because the supporting plate in the machines of the prior art performs all of the afore-described functions, it must, by necessity, be of considerable length, which makes it difficult to bind together small objects of rectangular cross-section. Furthermore, the steel tape tends to slacken when an object of cylindrical cross-section is bound with the afore-described machine of the prior art. In addition, the ultimate strength of the spot weld is not tested prior to releasing the bound objects.

_Object of the invention_

It is, therefore, a general object of the invention to provide a machine for binding objects together with steel tape, in which the afore-described drawbacks and disadvantages of corresponding machines of the prior art are substantially eliminated.

It is another object of the invention to provide a steel-tape binding machine which tests the ultimate strength of the spot welds joining the tape prior to releasing the objects to be bound.

It is still another object of the invention to provide a steel-tape binding machine which is simply constructed and less costly to manufacture than similar machines of the prior art.

_Description of the drawing_

With the above and related objects in view, this invention consists in the details of construction and combination of parts, as will be more fully understood from the following description, when read in conjunction with accompanying drawing, in which.

_Detailed description_

Figure 1:
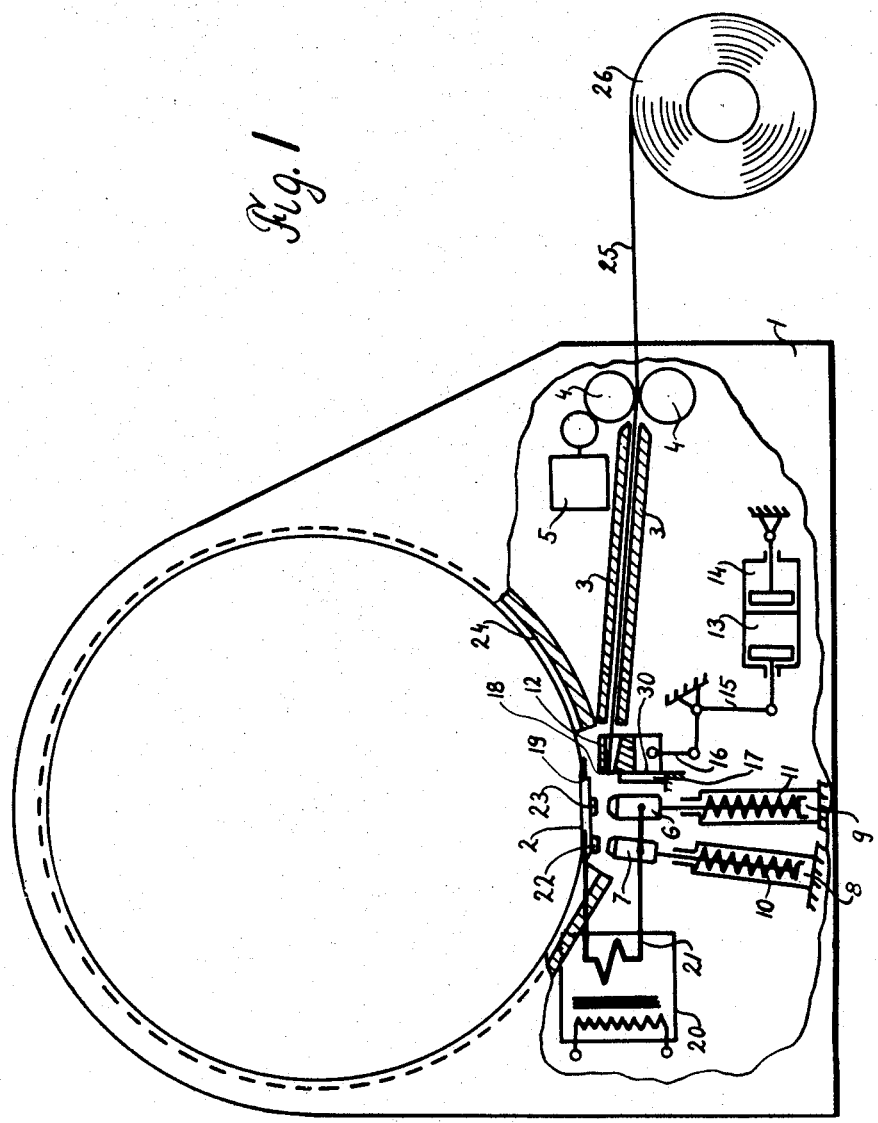
FIG. 1 is a side elevation partially in section, which illustrates schematically the steel-tape binding machine of the invention.

Referring now to the drawing, there is illustrated in FIG. 1 the machine of this invention, which comprises a frame 1, in which there is mounted a supporting plate 2, at the underside of which a pair of stationary electrodes 22 and 23 are secured. A pair of feed rollers 4 are rotatably mounted in the frame of the machine and are operatively connected to a hydraulic motor 5. The feed rollers 4 are adapted to feed a steel tape 25 from a reel 26 between a pair of guide plates 3, mounted in the frame 1, to a guiding arrangement 24, also mounted in the frame 1. The latter can be exchanged so that the guides thereof can be made to fit around the objects 27 to be bound. After the steel tape 25 has been bound around the objects 27 and the tape ends are clamped together in a manner to be described in detail below, the rotation of the pair of feed rollers 4 is reversed and the tape is tensioned by the feed rollers 4 and the hydraulic motor 5 around the objects to be bound.

Opposite the two stationary electrodes 22 and 23, there are mounted in the frame 1 a pair of reciprocally movable electrodes 6 and 7, which are respectively connected to a pair of single-acting hydraulic cylinders 8 and 9. Inside the latter there are respectively disposed coil springs 10 and 11 for returning the electrodes 6 and 7 from an active contact-position to an inactive non-contact position. One of the leads of the secondary winding 21 of a transformer 20 is connected to the stationary electrodes 22 and 23, and the other lead is connected to the movable electrodes 6 and 7.

A combination cutting and clamping device is mounted adjacent to the pair of guide plates 3 in the frame 1. This device comprises a member 12 having a bore, through which the steel tape 25 extends, and which is slidably mounted in the frame 1. A double hydraulic cylinder 13, 14 is pivotally supported in the frame 1 and is also pivotally connected to an elbow 15, which is, in turn, pivotally supported in the frame 1. One end of a rod 16 is pivotally connected to the member 12 and the other end is pivotally connected to the elbow 15. A stationary knife-edge member 17 is mounted adjacent to the member 12 and is adapted to cooperate with a complementary knife edge thereof. A recess 19 is provided at the underside of the supporting plate 2 and cooperates with a clamping member 18 mounted on top of the member 12.

*Operation*

Figure 2A:
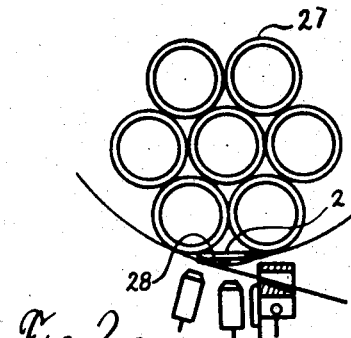
FIGS. 2a–2f illustrate schematically the various steps performed by the combination cutting and clamping device and the two reciprocally mounted electrodes and the manner in which they cooperate during the operation of the machine of this invention.

The steel tape 25 is guidingly urged around the objects 27 to be bound by the arrangement 24 so that the front end 28 of the steel tape is situated below the supporting plate 2 and over the stationary electrode 22 (FIG. 2a), the material to be bound being located inside the guide arrangement 24. The steel tape 25 is being fed forwardly by the feed rollers 4 during this phase of the operation.

Figure 2B:
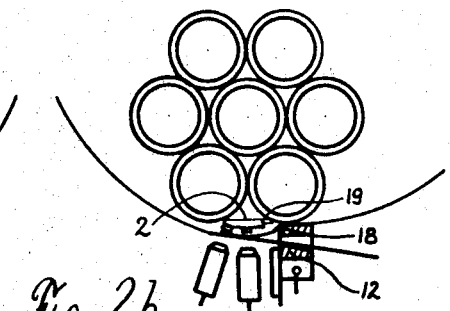

Thereafter the member 12 is raised so that the clamping edge 18 thereof clamps the overlapping end of the steel tape in the recess 19. The raising of the member 12 is effected by the hydraulic cylinder 13 via the elbow 15 and rod 16. (FIG. 2b).

Figure 2C:
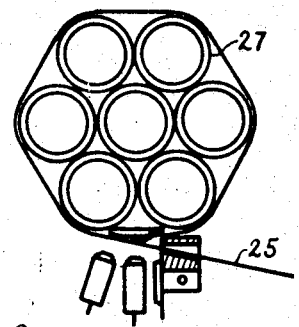

Thereafter the rotation of the feed rollers 4 is reversed so that they tighten the tape 25 around the objects to be bound (FIG. 2c).

Figure 2D:
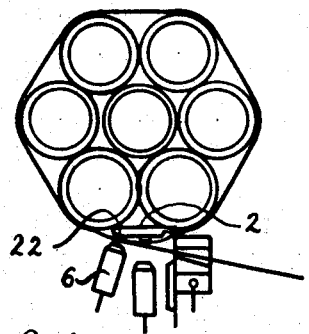

Next the movable hydraulic cylinder 8 is actuated and presses the electrode 7 against the electrode 22, thereby spot-welding together the overlapping tape 25, which is disposed therebetween by energizing the welding transformer 20 (FIG. 2d).

Figure 2E:
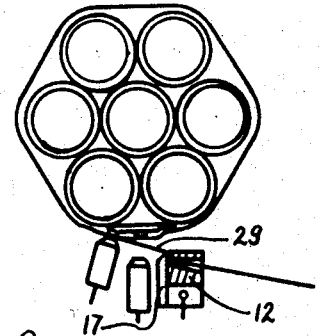

The member 12 is then moved downwardly by actuating the hydraulic cylinders 13 and 14, which causes the knife-edge member 17 to cut the tape 25. At the moment the tape 25 is cut, the loop of tape is under full load tension, and thereby the ultimate strength of the first spot weld is tested prior to forming the second spot weld. Thus, if the first weld fails, the binding operation is interrupted and is not resumed until the cause of failure has been eliminated (FIG. 2e).

Figure 2F:
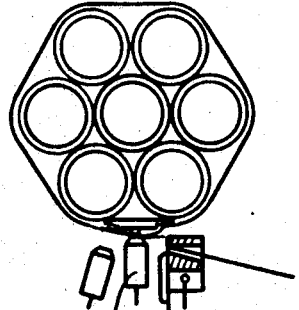

If the first weld does not fail, the binding operation continues. The movable hydraulic cylinder 9 is actuated and presses the electrode 6 against the electrode 23, thereby spot-welding together a second time the overlapping tape 25, which is disposed therebetween, by again energizing the welding transformer 20. (FIG. 2f). The latter step completes the operation of the binding machine of this invention.

Although this invention has been described in considerable detail, such description is intended as being illustrative rather than limiting, since the invention may be variously embodied, and the scope is to be determined as claimed.

Having thus set forth and disclosed the nature of this invention, what is claimed is:

1. A machine for binding together a plurality of objects with a tape, comprising in combination,
    a frame;
    guide means, operatively mounted in said frame for guiding a tape around said plurality of objects;
    a support plate, supported in said frame;
    first and second stationary electrodes mounted on said support plate;
    first and second movable electrodes, reciprocally mounted in said machine, respectively opposite said first and second stationary electrodes;
    first hydraulic driving means, selectively actuating said first and second movable electrodes so as to selectively urge them aaginst said first and second stationary electrodes;
    an electrical power source, adapted to be selectively electrically connected, respectively to said first and second stationary and movable electrodes;
    combination cutting and clamping means, reciprocally mounted on said frame, opposite said support plate;
    combination tape feeding and tensioning means, operatively mounted in said machine, the latter means being adapted to first feed said tape to said guide means until at least a portion of said tape around said plurality of objects overlaps.

2. The machine for binding together a plurality of object of objects with a tape as set forth in claim 1, wherein
    said combination tape feeding and tensioning means comprises a pair of walls defining a passage therethrough having an inlet and outlet, said outlet being adjacent to said combination cutting and clamping means, a pair of feed rollers rotatably mounted in said frame, adjacent to said inlet and adapted to first feed said tape through said passage and then tension said tape.

3. The machine for binding together a plurality of objects with a tape, as set forth in claim 2, including
    hydraulic motor means, operatively connected to said pair of feed rollers for selectively actuating them.

4. The machine for binding together a plurality of objects with a tape, as set forth in claim 2, wherein
    said combination cutting and clamping means comprises a member, reciprocally movably mounted in said frame, adjacent to said pair of walls, having a bore, through which said tape extends, and a clamping edge, adapted to clampingly hold said tape against said support plate, extending from the top of said member.

5. The machine for binding together a plurality of objects with a tape, as set forth in claim 4, including
    a stationary knife member, mounted adjacent to said reciprocally movably mounted member and adapted to cooperate with the latter so as to selectively cut said tape.

6. The machine for binding together a plurality of objects with a tape, as set forth in claim 5,
    including hydraulic actuating means, operatively connected to said reciprocally movably mounted member for selectively actuating in synchronization with said first movable electrode and said combination tape-feeding and tensioning means.

7. The machine for binding together a plurality of objects with a tape, as set forth in claim 1, wherein
    said electrical power source comprises a welding transformer, the secondary winding of which is selectively connected to said first and second stationary and movable electrodes.

References Cited

UNITED STATES PATENTS

| | | | |
|---|---|---|---|
| 1,650,843 | 11/1927 | McChesney | 100—26 |
| 1,694,512 | 12/1928 | McChesney | 100—29 |
| 1,868,182 | 7/1932 | Sullivan | 100—33 |
| 2,597,675 | 5/1952 | Sackett | 100—29 |
| 2,882,814 | 4/1959 | Winkler et al. | 100—25 |
| 3,031,949 | 5/1962 | Daniels et al. | 100—26 |

BILLY J. WILHITE, *Primary Examiner.*

U.S. Cl. X.R.

100—29, 33; 219—87, 89